Patented Nov. 7, 1939

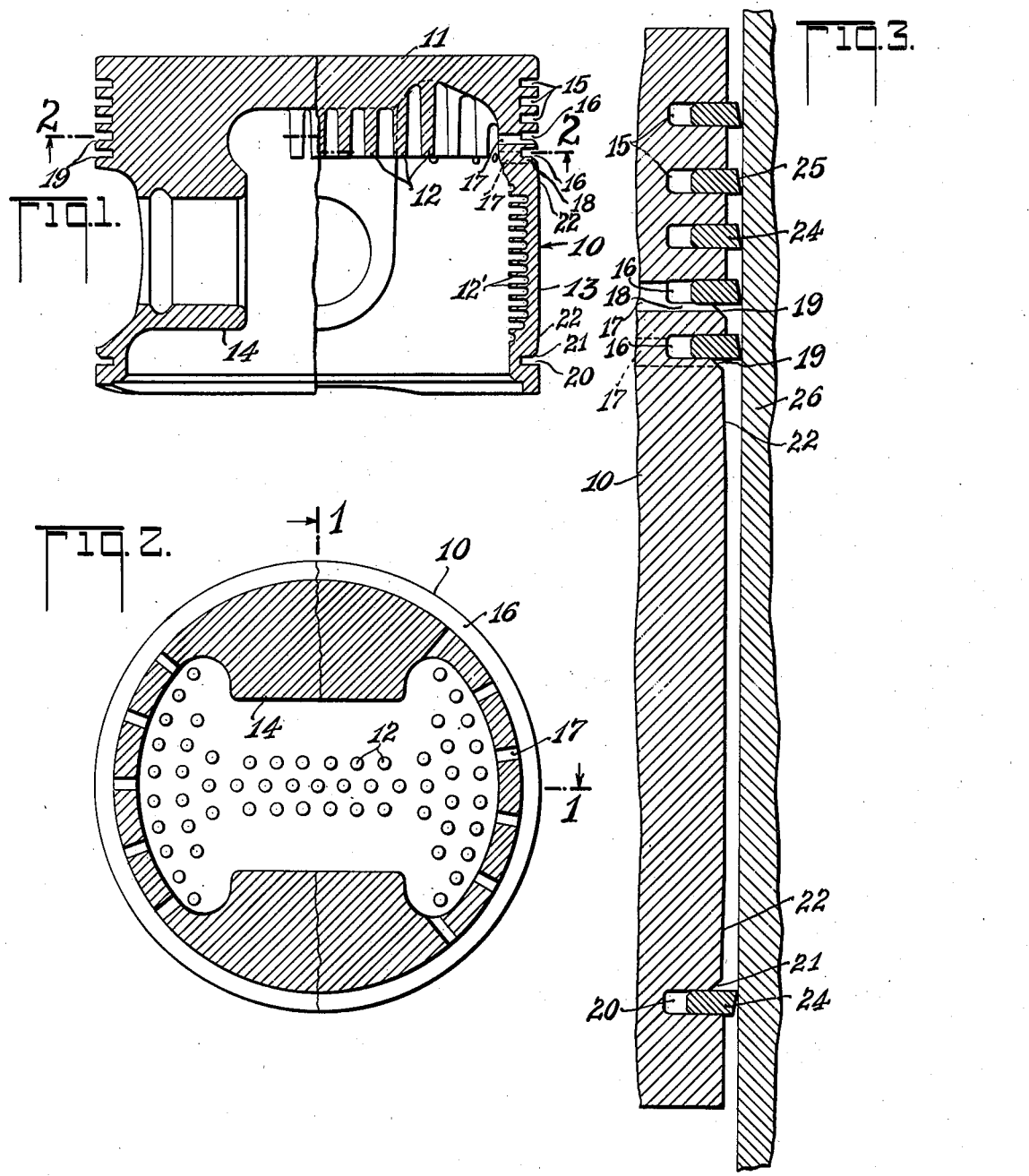

2,178,993

UNITED STATES PATENT OFFICE 2,178,993

PISTON RING ARRANGEMENT

Henry C. Hill, Montclair, N. J., assignor to Wright Aeronautical Corporation, a corporation of New York Application February 2, 1939, Serial No. 254,143

10 Claims. (Cl. 309—7)

This invention relates to improvements in pistons and piston rings therefor, particularly providing an improved arrangement of more or less conventional piston rings on a piston, by which superior lubrication and oil control may be obtained.

An object of the invention is to provide a disposition of compression and oil rings on a piston which shall assure adequate lubrication of the piston skirt and rings while minimizing the amount of oil which may pass the rings and be consumed in the combustion space above the piston, a related object being to provide a ring arrangement which shall suppress oil flow to the top of the piston which oil tends to carborize but which shall promote copious uni-directional oil flow along the piston skirt.

Provisions of the invention may be understood by reading the annexed detailed description in connection with the drawing, in which Fig. 1 is a split section through a piston on the line 1—1 of Fig. 2;

Fig. 2 is a section of the piston on the line 2—2 of Fig. 1, and

Fig. 3 is an enlarged diagrammatic section showing the mode of operation and assembly of the piston and rings.

The general form of the piston 10 is more or less conventional, the piston including a head 11 having integral cooling fins 12 depending therefrom, the head being integral with a skirt 13 having bosses 14 for the piston pin, not shown, and having cooling fins 12 machined on the interior thereof. In the preferred embodiment rectangular grooves 15 are provided for compression piston rings beneath which are formed oil ring grooves 16 having drain holes 17 extending from the groove bottoms to the interior of the piston. These holes are so drilled that their topmost portions lie below the uppermost wall of their respective grooves, while the lowermost wall of each hole 17 lies below the lowermost wall of the corresponding groove as indicated at 18. The bottom corner of each of the grooves 16 is chamfered as at 19.

Below the piston pin bosses 14 an additional ring groove 20 is formed, this having a chamfer 21 on the upper corner of the groove. The skirt may be provided with small tapers 22 adjacent the lowermost groove 16 and the groove 20 to afford oil entraining wedge shaped spaces to improve lubrication on the skirt according to previously known practice.

Referring to Fig. 3 it will be seen that the piston rings 24, as applied to all of the grooves, are identical in form, each ring having its outer face 25 slightly tapered, this wall comprising the surface which is in contact with the engine cylinder indicated at 26. This taper is preferably of the order of 2°. The five top rings occupying the grooves 15 and 16 are all disposed with the scraping edge toward the bottom, while the bottom ring occupying the groove 20 is arranged with its scraping edge toward the top of the piston. This arrangement of inversion of the bottom ring along with the arrangement of the top rings, the groove forms, and the chamfers 19 and 21, is the essence of this invention and provides an oil control system which has been found highly successful in operation. Piston performance is improved by this arrangement in the following manner:

The inverted bottom ring in the groove 20 serves to pump oil upwardly and across the surface of the piston skirt on each stroke of the piston. The oil reaches the rings in the grooves 16 which scrape oil from the cylinder wall whence it passes through the drillings 17 to the piston interior. Any oil tending to pass the ring occupying the upper groove 16 will meet the scraping edges of the compression rings, accumulations of oil being forced to the crankcase through the grooves 16 and their associated drain holes. In effect, this ring arrangement produces what might be called "uniflow" lubrication of the piston since on a piston down stroke oil passes upwardly along the skirt as the piston ring of the groove 20 rides over the film on the cylinder wall and likewise, on the up stroke of the piston the oil along the skirt is carried upwardly by the scraping action of the bottom ring. As previously indicated, this relatively large quantity of oil going along the piston is relieved through the holes at 17. All conventional piston flow is in both directions on the piston skirt and is therefore limited in quantity. The uniflow movement of oil greatly assists in cooling the piston skirt and rings, because fresh oil is added on each stroke and because the copious oil film seals the piston against the cylinder wall throughout its normal contact area. Lubrication is further improved by virtue of the slug of oil covering the piston skirt and entrained in the chamfer 21 and the taper 22 at the bottom of the piston and in the chamfer 19 and the taper 22 at the top of the piston.

Consumption has been reduced in spite of the increased flow of oil along the piston skirts, this being due to the use of the double scraper rings above the piston pin. The invention presents a further advantage in that the identical form of piston ring may be used in all grooves—previously, three different types of rings were used on each piston. The small 2° taper on the outer edge of each piston ring seems to improve oil flow and lubrication but causes no undue loss of compression from the combustion chamber. The small taper is found to have long life without wearing out in view of the copious lubrication of the cylinder wall, and allows of quicker seating of the ring on the cylinder wall when newly installed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In combination, in a piston having a plurality of upper ring grooves above the piston skirt and having a lower ring groove at the bottom of the skirt, tapered edge piston rings disposed in said grooves, the rings of the top grooves having their scraping edges toward the bottom of the piston and the ring in the lower groove having its scraping edge toward the top of the piston.

2. In combination, in a piston having a plurality of upper ring grooves above the piston skirt and having a lower ring groove at the bottom of the skirt, tapered edge piston rings disposed in said grooves, the rings of the top grooves having their scraping edges toward the bottom of the piston and the ring in the lower groove having its scraping edge toward the top of the piston, the lowermost of said upper grooves having drain holes through the piston wall and interrupting the lower wall of the groove.

3. In combination, a piston having a central skirt portion and having ring grooves above and below the skirt, and piston rings having tapered outer surfaces engaged in said grooves, said rings all having their sharper, or scraping edges, facing toward the piston skirt.

4. In combination, a piston having a central skirt portion and having ring grooves above and below the skirt, piston rings having tapered outer surfaces engaged in said grooves, said rings all having their sharper, or scraping edges, facing toward the piston skirt, and one at least of said upper grooves having holes extending between the groove bottom and the piston interior.

5. In combination, a piston having a central skirt portion and having ring grooves above and below the skirt, and piston rings having tapered outer surfaces engaged in said grooves, said rings all having their sharper, or scraping edges, facing toward the piston skirt, those groove edges nearest the skirt being chamferred to provide an oil containing annulus.

6. In combination, a piston having a central skirt portion, a grooved portion above the skirt and a groove below the skirt, compression piston rings in the uppermost grooves, an oil scraper ring in at least one groove adjacent to and above the skirt to suppress passage of oil thereabove, said scraper ring groove having drain holes communicating with the piston interior, and an inverted scraper ring in the groove below the skirt to promote oil flow from below the piston to said skirt as the piston reciprocates.

7. In combination, in a piston having a skirt and ring grooves above and below the skirt, a scraper piston ring in the lower groove disposed to scrape oil upwardly from an oil coated cylinder wall with which the piston and rings engage, and a scraper piston ring in a groove above the skirt disposed to scrape oil tending to pass there-above.

8. In combination, in a piston having a skirt and ring grooves above and below the skirt, a scraper piston ring in the lower groove disposed to scrape oil upwardly from an oil coated cylinder wall with which the piston and rings engage, a scraper piston ring in a groove above the skirt disposed to scrape oil tending to pass thereabove, and chamfers on the upper and lower corners of respective grooves to provide oil containing annuli.

9. In combination in a piston having a skirt and ring grooves above and below the skirt, a scraper piston ring in the lower groove disposed to scrape oil upwardly from an oil coated cylinder wall with which the piston and rings engage, a scraper piston ring in a groove above the skirt disposed to scrape oil tending to pass thereabove, and chamfers on the upper and lower corners of respective grooves to provide oil containing annuli, said piston having holes establishing communication between the piston interior and the upper of said chamfers.

10. In combination in a piston having a skirt and ring grooves above and below the skirt, a scraper piston ring in the lower groove disposed to scrape oil upwardly from an oil coated cylinder wall with which the piston and rings engage, a scraper piston ring in a groove above the skirt disposed to scrape oil tending to pass thereabove, chamfers on the upper and lower corners of respective grooves to provide oil containing annuli, said piston having holes establishing communication between the piston interior and the upper of said chamfers, and compression piston rings disposed in grooves above said upper scraper ring.

HENRY C. HILL.